(12) United States Patent
Okuda

(10) Patent No.: US 6,735,303 B1
(45) Date of Patent: May 11, 2004

(54) PERIODIC SIGNAL DETECTOR

(75) Inventor: Kozo Okuda, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/219,928

(22) Filed: Dec. 23, 1998

(30) Foreign Application Priority Data

Jan. 8, 1998 (JP) .......................................... 10/002447

(51) Int. Cl.$^7$ ................................................ H04B 3/23
(52) U.S. Cl. .................................. 379/406.04; 370/526
(58) Field of Search .......................... 381/56; 704/213; 379/406.04

(56) References Cited

U.S. PATENT DOCUMENTS 3,537,001 A * 10/1970 Friend ..................... 324/76.47
5,592,548 A * 1/1997 Sih ........................ 379/406.08
5,684,600 A * 11/1997 Miyazaki et al. ........... 358/298
5,970,441 A * 10/1999 Mekuria ..................... 704/207
5,970,447 A * 10/1999 Ireton ......................... 704/233

* cited by examiner

*Primary Examiner*—Minsun Oh Harvey
*Assistant Examiner*—Daniel Swerdlow
(74) *Attorney, Agent, or Firm*—Smith, Gambrell & Russell, LLP

(57) ABSTRACT

A periodic signal detector includes sample counting means for counting a number of samples between adjacent zero cross points in an input signal, the sample counting means outputting the number of samples between each time the number of samples between the adjacent zero cross points is obtained and continuing outputting the number of samples until a next zero cross point is detected, and periodic signal section detecting means for detecting a section, as a periodic signal section, in which the output from the sample counting means has a constant result.

4 Claims, 6 Drawing Sheets

PERIODIC SIGNAL DETECTOR

BACKGROUND OF THE INVENTION

1. Field of the Invention

The present invention relates generally to a periodic signal detector for use in controlling the operation of an echo canceller, a noise canceller, and the like.

2. Prior Art

Heretofore, an echo canceller has been known which estimates an echo flowing through a channel to subtract the echo from an echo signal transmitted to the channel, thereby cancelling the echo. The echo estimation is done by updating coefficients of an adaptive filter for generation of an echo replica signal.

In a case where, however, such an echo canceller receives a signal having high periodicity (periodic signal) such as a sine-wave signal, the updating of the filter coefficients is degraded. It is therefore preferred that the echo canceller suspends the updating of the filter coefficients when it receives the periodic signal. For example, signals having high periodicity for a telephone system include a tone signal, a push-button dial (DTMF: dual tone multi-frequency) signal, a holding tone and the like.

The suspension of the updating of the filter coefficients in response to an input of the signal having high periodicity requires the detection of the signal having high periodicity. A technique for detecting the signal having high periodicity includes a method which uses FFT analysis to detect the signal having high periodicity. This method, however, requires large amounts of data to be processed and much time for detection, and therefore is difficult to apply to the echo canceller.

SUMMARY OF THE INVENTION

In view of the foregoing, it is an object of the invention to provide a periodic signal detector adapted for quick detection of a signal having high periodicity by using small amounts of data to be processed.

A periodic signal detector according to the invention comprises: sample counting means for counting a number of samples between adjacent zero cross points in an input signal, the sample counting means outputting the number of samples each time the number of samples between the adjacent zero cross points is obtained and continuing outputting the number of samples until a next zero cross point is detected; and detecting means for detecting a section, as a periodic signal section, in which the output from the sample counting means has a constant result.

The detecting means used herein comprises, for example, a high-pass filter receiving the output from the sample counting means for outputting, as a zero output value, the section in which the output from the sample counting means has the constant result, zero counting means for counting the number of successively sampled zeros included in the output from the high-pass filter, and judgment circuit for detecting a section, as the periodic signal section, in which an output from the zero counting means is not less than a predetermined threshold value.

Preferably, the periodic signal detector further comprises a low-pass filter for suppressing an unwanted zero cross variation due to a noise in the input signal, an output of which low-pass filter is supplied to an output to the sample counting means.

DETAILED DESCRIPTION OF PREFERRED EMBODIMENT

Now, a preferred embodiment according to the invention will now be described with reference to the accompanying drawings.

Figure 1:
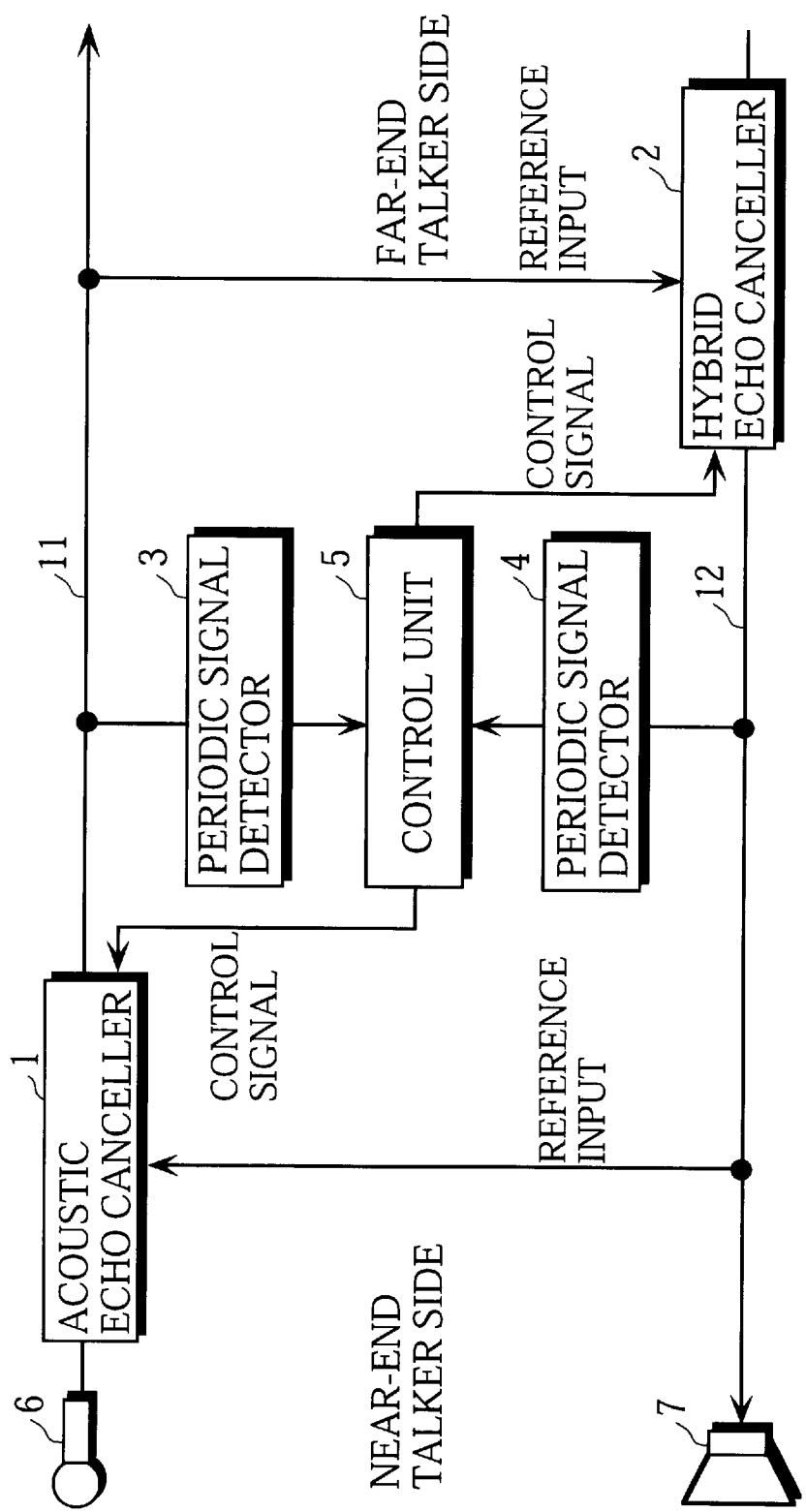
FIG. 1 is a block diagram showing a general construction of an echo canceller block.

FIG. 1 diagrammatically illustrates the general construction of an echo canceller block.

The echo canceller block includes an acoustic (a sound-side) echo canceller 1 provided for a transmitting channel 11, a hybrid (a line-side) echo canceller 2 provided for a receiving channel 12, a first periodic signal detector 3 for detecting a signal with high periodicity which flows through the transmitting channel 11, a second periodic signal detector 4 for detecting a signal with high periodicity which flows through the receiving channel 12, and a control unit 5 for controlling both of the echo cancellers 1 and 2.

A near-end talker audio signal inputted at a microphone 6 provided on a near-end talker side is sent through the acoustic echo canceller 1 to a far-end talker side. A far-end talker audio signal from the far-end talker side is sent through the hybrid echo canceller 2 to a speaker 7 provided on the near-end talker side.

The acoustic echo canceller 1 is provided to remove an echo signal flowing through the transmitting channel 11, whereas the hybrid echo canceller 2 is provided to remove an echo signal flowing through the receiving channel 12. The control unit 5 controls both echo cancellers 1 and 2 based on detection signals from the first and second periodic signal detectors 3 and 4.

Figure 2:
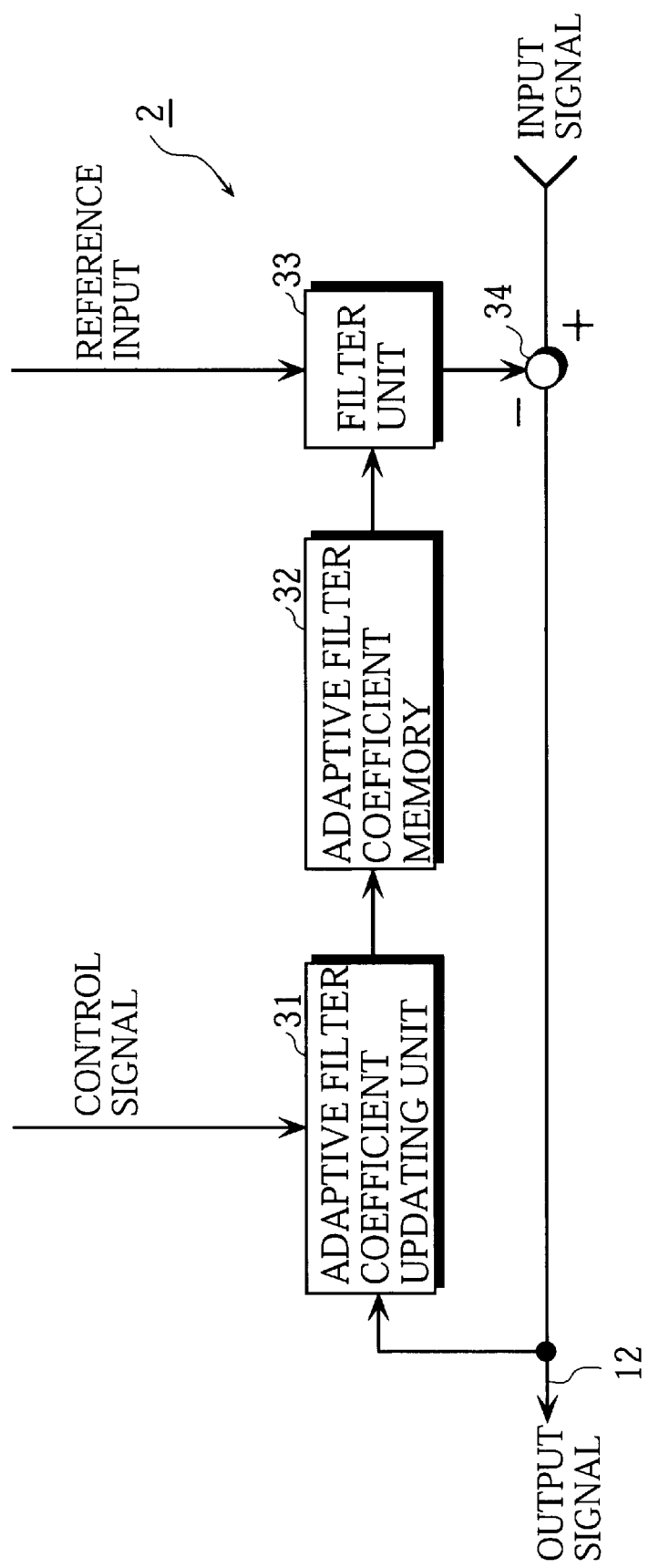
FIG. 2 is a block diagram showing a construction of a hybrid echo canceller 2.

FIG. 2 diagrammatically illustrates the construction of the hybrid echo canceller 2.

The hybrid echo canceller 2 includes a filter coefficient updating unit 31 for updating a filter coefficient, a coefficient memory 32 for storing therein the latest filter coefficient provided from the filter coefficient updating unit 31, a filter unit 33 using a signal from the transmitting channel 11 as a reference input thereby to generate a first echo replica signal according to the filter coefficient stored in the coefficient memory 32, and a subtracter 34 for subtracting the first echo replica signal from an input signal sent to the receiving channel 12. The filter coefficient updating unit 31 updates the coefficient so that subtraction errors outputted from the subtracter 34 become zero. The filter coefficient updating unit 31 receives a control signal from the control unit 5.

The control unit 5 controls the filter coefficient updating unit 31 so that the filter coefficient updating unit 31 suspends the updating when the first periodic signal detector 3 detects the signal having high periodicity.

The acoustic echo canceller 1 has a similar construction to the hybrid echo canceller 2, and hence the description of the construction of the acoustic echo canceller 1 is dispensed with herein. It is to be noted that the control unit 5 controls the filter coefficient updating unit 31 of the acoustic echo canceller 1 so that the filter coefficient updating unit 31 suspends the updating when the second periodic signal detector 4 detects the signal having high periodicity.

Figure 3:
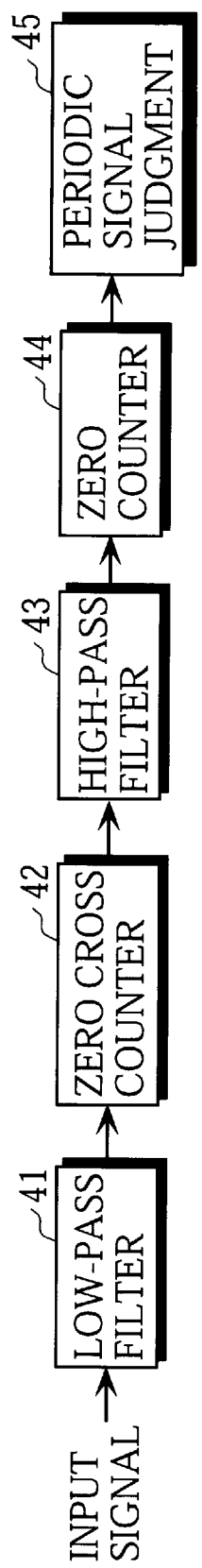
FIG. 3 is a block diagram showing a construction of a periodic signal detector.

FIG. 3 diagrammatically illustrates the construction of the periodic signal detectors 3 and 4. FIGS. 4a to 4d show signals in the respective units of FIG. 3.

Figure 4:
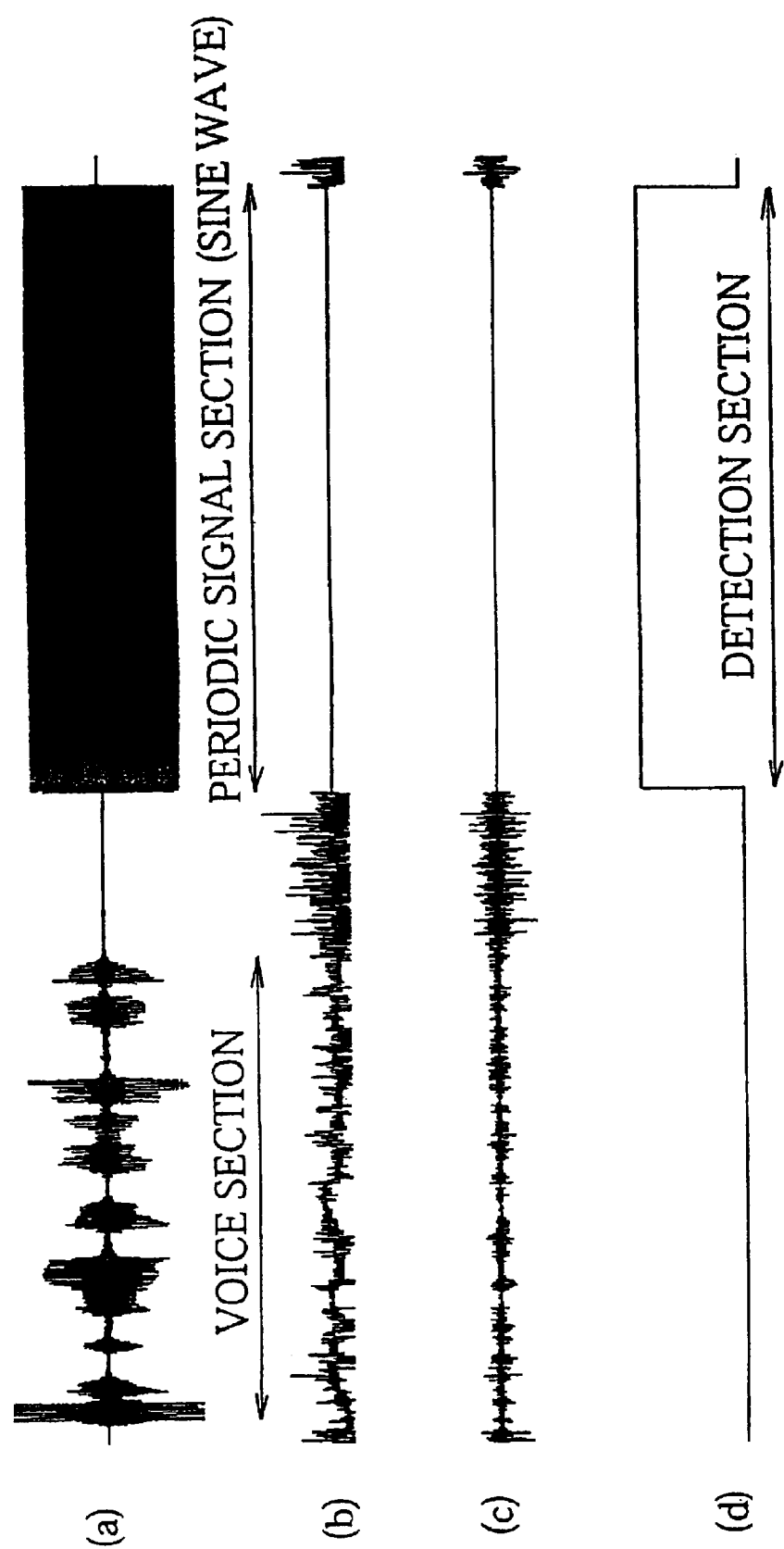
FIGS. 4a to 4d are a timing chart showing signals in respective units shown in FIG. 3.

The input signal is sent to a low-pass filter 41. FIG. 4a shows an example of the input signal. In this example, the input signal of FIG. 4a contains a voice section and a periodic signal section (sine wave). The low-pass filter 41 serves to remove high-frequency components from the input signal for suppressing an unwanted zero cross variation due to noises and the like.

The signal passing through the low-pass filter 41 is sent to a zero cross counter 42. The zero cross counter 42 counts a number of samples between two adjacent zero cross points. The zero cross counter 42 continues outputting the number of samples counted between the two adjacent zero cross points until the next zero cross point is detected. FIG. 4b shows the output from the zero cross counter 42 in a case where the signal shown in FIG. 4a is inputted to the periodic signal detector.

Figure 5:
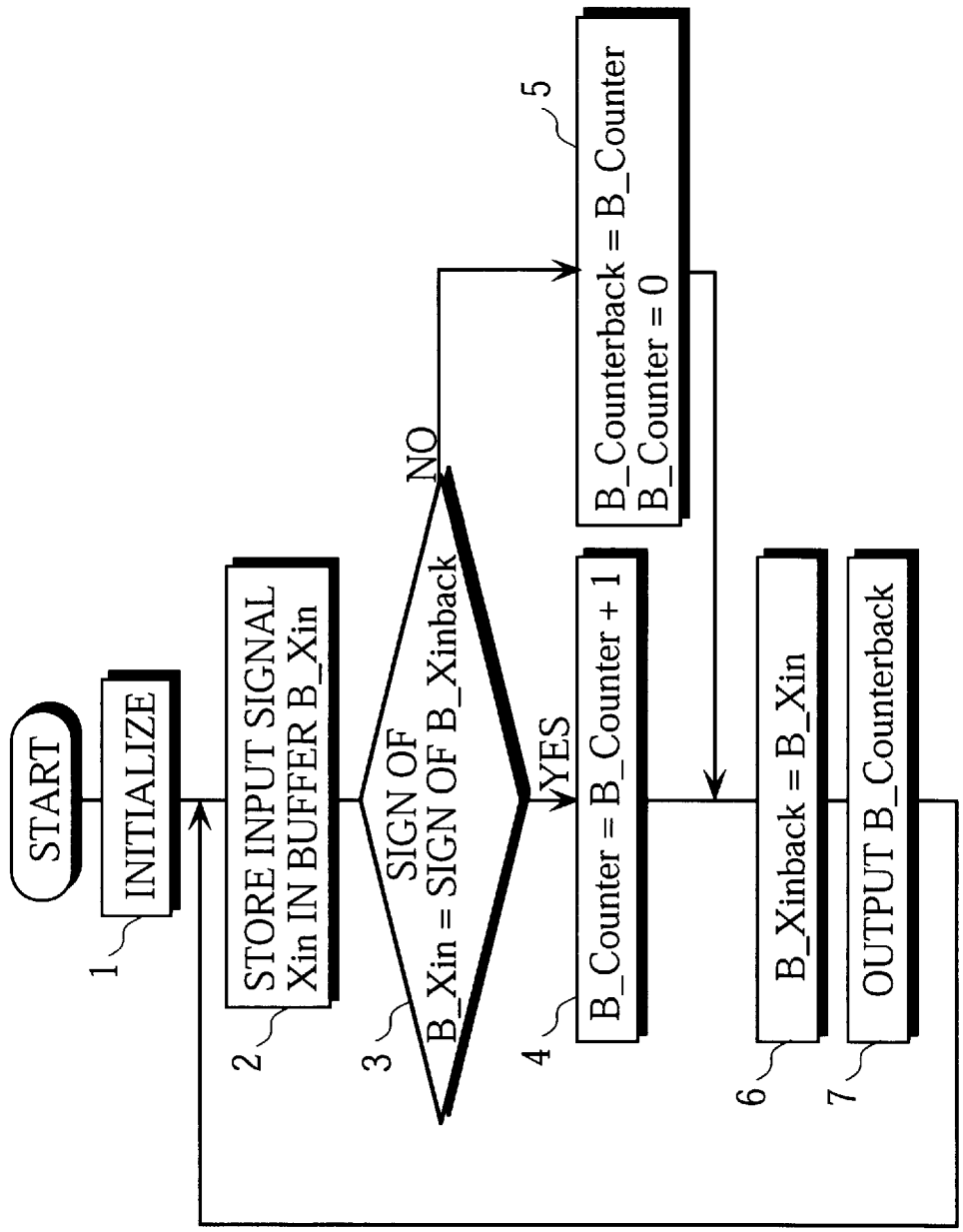
FIG. 5 is a flow chart representing steps in a procedure taken by a zero cross counter.

FIG. 5 shows a procedure taken by the zero cross counter 42.

First, the zero cross counter 42 is initialized (Step 1). The initialization includes resetting a buffer B_Xinback for storing the preceding input signal "Xinback", a buffer B_Xin for storing the current input signal "Xin", a buffer B_Counter serving as a counter for counting the number of samples, and a buffer B_Counterback for storing the content "Counter" of the buffer B_Counter at the time of detection of a zero cross point as the preceding number of samples "Counterback".

Next, the current input signal "Xin" is stored in the buffer B_Xin (Step 2). Then, a judgment is made as to whether or not the content (current input signal) "Xin" of the buffer B_Xin and the content (preceding input signal) "Xinback" of the buffer B_Xinback have the same sign (Step 3).

If the content "Xin" of the buffer B_Xin and the content "Xinback" of the buffer B_Xinback have the same sign, it is determined that there has been no zero cross point between the preceding input and the current input, and the content "Counter" of the buffer B_Counter is incremented by one (Step 4). Then, the flow proceeds to Step 6.

If the content "Xin" of the buffer B_Xin and the content "Xinback" of the buffer B_Xinback have opposite signs, it is determined that there has been a zero cross point between the preceding input and the current input. The content "Counter" of the buffer B_Counter is stored in the buffer B_Counterback, and the buffer B_Counter is reset (Step 5). Then, the flow proceeds to Step 6.

In Step 6, the content "Xin" of the buffer B_Xin is stored in the buffer B_Xinback. Next, the content "Counterback" of the buffer B_Counterback is outputted (Step 7). Then, the flow returns to Step 2.

The output from the zero cross counter 42 is sent to a high-pass filter 43. With regard to a signal having high periodicity, the output from the zero cross counter 42 has a constant result, i.e. a DC component. Thus, an output from the high-pass filter 43 for the signal having high periodicity is zero regardless of the frequency thereof. A signal of FIG. 4c represents the output from the high-pass filter 43 when the signal of FIG. 4a is inputted to the periodic signal detector.

The output from the high-pass filter 43 is sent to a zero counter 44. The zero counter 44 counts the number of successively sampled zeros. Since the output from the high-pass filter 43 for the signal with high periodicity is zero regardless of the frequency thereof, the output value from the zero counter 44 gradually increases in the periodic signal section.

Figure 6:
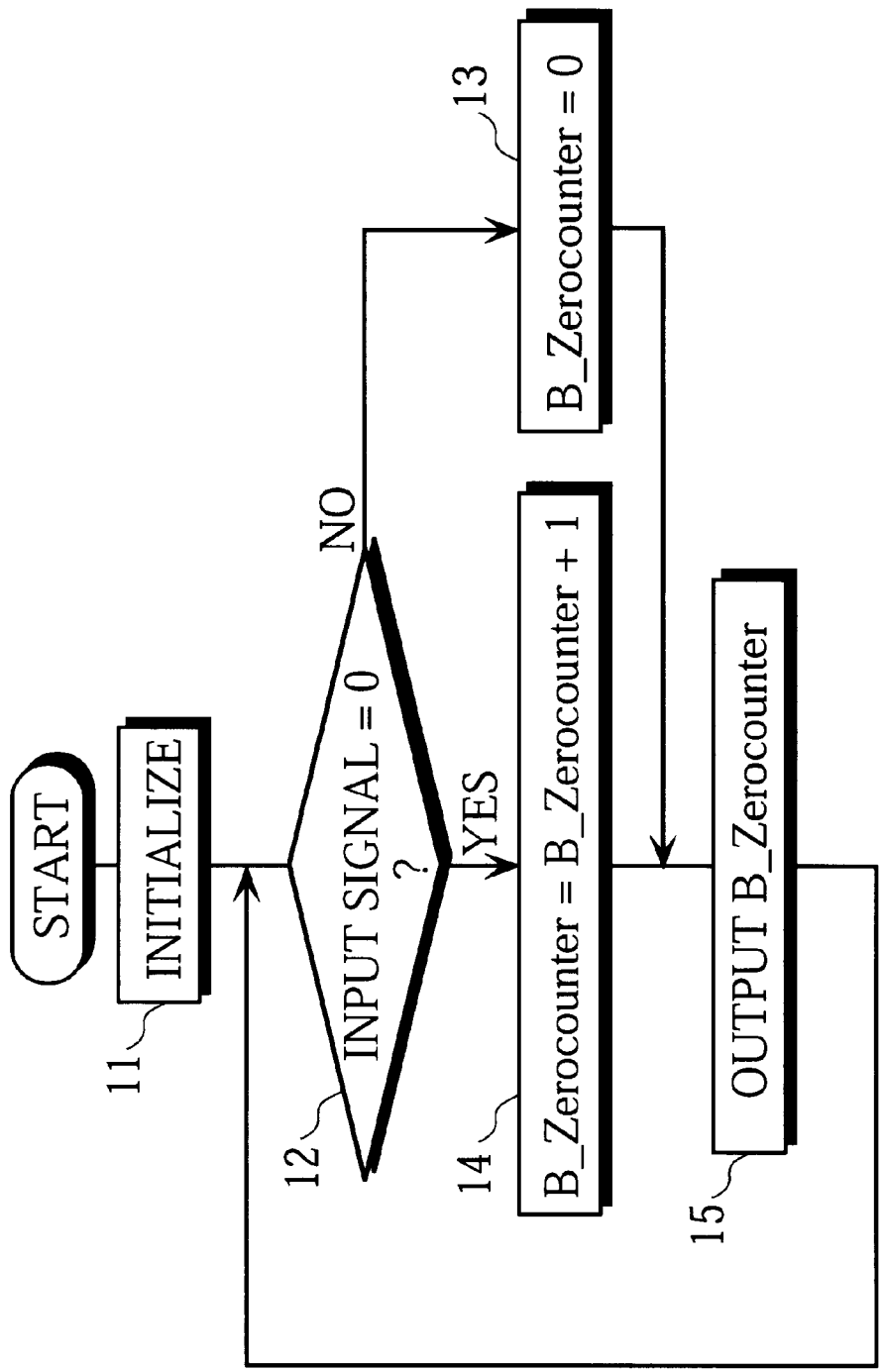
FIG. 6 is a flow chart representing steps in a procedure taken by a zero counter.

FIG. 6 shows a procedure taken by the zero counter 44.

First, the zero counter 44 is initialized (Step 11). The initialization includes resetting a buffer B_Zerocounter serving as a counter for counting the number of successively sampled zeros.

A judgment is made as to whether or not the input signal is zero (Step 12). If the input signal is not zero, the buffer B_Zerocounter is reset (Step 13). Specifically, the content "Zerocounter" of the buffer B_Zerocounter is set to zero. Then, the flow proceeds to Step 15.

If the input signal is zero, the content "Zerocounter" of the buffer B_Zerocounter is incremented by one (Step 14). Then, the flow proceeds to Step 15.

In Step 15, the content "Zerocounter" of the buffer B_Zerocounter is outputted. The flow then returns to Step 12.

The output from the zero counter is sent to a periodic signal judgment unit 45. The periodic signal judgment unit 45 outputs a periodic signal detection signal (high-level signal) when the output from the zero counter 44 is not less than a predetermined threshold value. FIG. 4d shows the output from the periodic signal judgment unit 45 when the signal shown in FIG. 4a is inputted to the periodic signal detector.

The signal having high periodicity which is detectable by the periodic signal detector is a periodic signal basically having a single frequency. For detection of a periodic signal having one of a group of relatively high frequencies (e.g., 1,209 Hz, 1,336 Hz, 1,477 Hz) and one of a group of relatively low frequencies (e.g., 697 Hz, 770 Hz, 852 Hz, 941 Hz) superimposed, such as a DTMF signal, a filter and the like may be used to separate the input signal into two components: a component having the group of relatively high frequencies and a component having the group of relatively low frequencies. Thereafter the periodic signal detector may be applied to one of the two separated components. For example, an effective method is such that the high-pass filter which can pass frequencies above 1100 Hz is used to extract only the component having the group of relatively high frequencies from the input signal, and then the aforesaid periodic signal detector is used to detect the signal having high periodicity from the extracted component having the group of relatively high frequencies.

What is claimed is:

1. A periodic signal detector for an echo canceller apparatus including an echo canceller and a controller for controlling said echo canceller in accordance with an output signal from the periodic signal detector, the periodic signal detector comprising:

sample counting means for counting the number of samples between adjacent zero cross points in an input signal, the sample counting means outputting the number of samples each time the number of samples between the adjacent zero cross points is obtained, and continuing outputting the number of samples until a next zero cross point is detected; and detecting means for detecting a section, as a periodic signal section, in which the output from the sample counting means has a constant result, said detecting means including a zero counting means for counting the number of successively sampled zeros included in the output from a high-pass filter, and a judgment circuit for determining a section, as the periodic signal section, in which an output from the zero counting means is not less than a predetermined threshold value and providing a signal representative thereof as the output signal.

2. The periodic signal detector as set forth in claim 1, wherein the detecting means further comprises:

a high-pass filter receiving the output from the sample counting means for outputting, as a zero output value, the section in which the output from the sample counting means has the constant result.

3. The periodic signal detector as set forth in claim 1, further comprising a low-pass filter for suppressing an unwanted zero cross variation due to a noise in the input signal, the sample counting means receiving an output from the low-pass filter.

4. The periodic signal detector as set forth in claim 2, further comprising a low-pass filter for suppressing an unwanted zero cross variation due to a noise in the input signal, the sample counting means receiving an output from the low-pass filter.

* * * * *